(12) United States Patent
Pluchon et al.

(10) Patent No.: US 11,649,196 B2
(45) Date of Patent: May 16, 2023

(54) ENCAPSULATION OF ACTIVE SUBSTANCES AND/OR MICRO-ORGANISMS IN A LAMELLAR MATERIAL

(71) Applicants: AGRO INNOVATION INTERNATIONAL, Saint-Malo (FR); UNIVERSITE DE HAUTE ALSACE, Mulhouse (FR); CENTRE NATIONAL DE LA RECHERCHE SCIENTIFIQUE, Paris (FR)

(72) Inventors: Sylvain K. Pluchon, Saint-Malo (FR); Jean-Claude Yvin, Saint-Malo (FR); Jocelyne Brendle, Wittenheim (FR); Lionel Limousy, Heidwiller (FR); Patrick Dutournie, Soppe le Bas (FR); Anne Maillard, Saint-Malo (FR); Marion Bruneau, Saint Jean de Thouars (FR); Simona Bennici, Illfurth (FR)

(73) Assignees: AGRO INNOVATION INTERNATIONAL, Saint-Malo (FR); UNIVERSITE DE HAUTE ALSACE, Mulhouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 123 days.

(21) Appl. No.: 16/964,122

(22) PCT Filed: Jan. 22, 2019

(86) PCT No.: PCT/FR2019/050140
§ 371 (c)(1),
(2) Date: Jul. 22, 2020

(87) PCT Pub. No.: WO2019/145636
PCT Pub. Date: Aug. 1, 2019

(65) Prior Publication Data
US 2021/0032178 A1 Feb. 4, 2021

(30) Foreign Application Priority Data
Jan. 23, 2018 (FR) ...................................... 1850504

(51) Int. Cl.
*C05G 5/30* (2020.01)
*C05G 3/80* (2020.01)
(Continued)

(52) U.S. Cl.
CPC ................. *C05G 5/35* (2020.02); *C05D 9/02* (2013.01); *C05F 11/08* (2013.01); *C05F 11/10* (2013.01); *C05G 3/60* (2020.02); *C05G 3/80* (2020.02)

(58) Field of Classification Search
None
See application file for complete search history.

(56) References Cited

U.S. PATENT DOCUMENTS 5,252,542 A * 10/1993 Allan ....................... A61L 9/042
427/213.36
2009/0233107 A1 9/2009 Yamada et al.
(Continued)

FOREIGN PATENT DOCUMENTS

WO WO 2005/009604 A1 * 2/2005 .............. B01J 13/18

OTHER PUBLICATIONS

Claverie Marie et al. "Synthetic Talc and Talc-Like Structures: Preparation. Features and Applications", vol. 24, No. 3, Jan. 12, 2018, pp. 519-542, Chemistry—A European Journal, Wiley—V C H Verlag GMBH & Co. KGAA.
(Continued)

*Primary Examiner* — Wayne A Langel
(74) *Attorney, Agent, or Firm* — Hamre, Schumann, Mueller & Larson, P.C.

(57) ABSTRACT

The present invention relates to a method for encapsulating a compound selected from the group consisting of at least one active substance, at least one microorganism and mixtures thereof in an organic-inorganic hybrid material of 2:1 lamellar structure, said material having the following general formula I:

$$Na_x[(Mg_3)(Al_x(RSi)_{4-x})O_{8+x}(OH)_2] \qquad (I)$$

(Continued)

the method comprising:
a) sol-gel synthesis of the organic-inorganic hybrid material of 2:1 lamellar structure in the presence of the compound;
b) recovery of the compound encapsulated in the material of general formula I.

It further relates to the compound encapsulated in an organic-inorganic hybrid material of 2:1 lamellar structure of general formula I, a composition comprising same and its use for fertilizing, feeding, stimulating growth and/or prophylaxis of plants and/or improvement of the physical, chemical and/or biological properties of the soil or of the culture substrate of plants.

20 Claims, 2 Drawing Sheets

(51) Int. Cl.

| | | |
|---|---|---|
| *C05G 3/60* | (2020.01) | |
| *C05D 9/02* | (2006.01) | |
| *C05F 11/08* | (2006.01) | |
| *C05F 11/10* | (2006.01) | |
| *C05G 5/35* | (2020.01) | |

(56) References Cited

U.S. PATENT DOCUMENTS

2013/0040817 A1\* 2/2013 Dreher ................ A23P 10/30
977/773
2014/0230504 A1\* 8/2014 Finlayson .............. C12N 1/165
435/252.9
2020/0230065 A1\* 7/2020 Urrutia Sagardia . A61K 9/4816

OTHER PUBLICATIONS

Hua Shao et al. "Synthesis and Properties of Nanoparticle Forms Saponite Clay. Cancrinite Zeolite and Phase Mixtures Thereof", Apr. 9, 2010, 18 pages.
Rimple B. Bhatia et al. "Aqueous Sol-Gel Process for Protein Encapsulation" Chemistry of Materials, vol. 12, No. 8, Aug. 1, 2000, pp. 2434-2441.
Gill I et al. "Bioencapsulation within synthetic polymers (Part 1): sol-gel encapsulated biologicals" Trends in Biotechnol, Elsevier Publications, Cambridge, GB, vol. 18, No. 7, Jul. 1, 2000, pp. 282-296.
Nadine Nassif et al. "A sol-gel matrix to preserve the viability of encapsulated bacteria" Journal of Materials Chemistry, GB, vol. 13, No. 2, Jan. 10, 2003, pp. 203-208.
F. L. Sousa et al. "Encapsulation of essential oils in SiO2 microcapsules and release behaviour of volatile compounds"Journal of Microencapsulation., GB,vol. 31, No. 7, Apr. 25, 2014, 10 pages.
Lorena Betancor et al. "Advantages of the Pre?Immobilization of Enzymes on Porous Supports for Their Entrapment in Sol-Gels", Biomacromolecules 2005, 6, 1027-1030.
International Search Report and Written Opinion issued for International Patent Application No. PCT/FR2019/050140, dated Jun. 24, 2019, 18 pages including English translation of Search Report.
International Search Report and Written Opinion issued for International Patent Application No. PCT/FR2019/050142, dated Jun. 24, 2019, 17 pages including English translation of Search Report.
U.S. Appl. No. 16/964,125, filed Jul. 22, 2020.

\* cited by examiner

FIG 3

ENCAPSULATION OF ACTIVE SUBSTANCES AND/OR MICRO-ORGANISMS IN A LAMELLAR MATERIAL

The present invention relates to the encapsulation of active substances and/or microorganisms, intended for growing or treating plants, in lamellar materials.

The encapsulation of active substances in clays such as synthetic clays is already known (US 2009/0233107). However, such encapsulation takes place after synthesis of the clay, which therefore requires the use of a two-step method.

Furthermore, there is no document that mentions the encapsulation of microorganisms in a clay, whether natural or synthetic.

Now, the inventors have discovered, surprisingly, that it is possible to encapsulate such microorganisms and/or active substances in synthetic clay of the talc or saponite type during synthesis of these clays, i.e. in a single step, while maintaining the activity of the active substances and microorganisms.

The present invention therefore relates to a method for encapsulating a compound selected from the group consisting of at least one active substance, at least one microorganism and mixtures thereof in an organic-inorganic hybrid material of lamellar structure of 2:1 type, said material having the following general formula I:

$$Na_x[(Mg_3)(Al_x(RSi)_{4-x}O_{8+x}(OH)_2] \quad (I)$$

in which x is a number such that $0 \leq x < 1.2$ and

R represents a $C_1$-$C_{30}$ alkyl group, an aryl group, a ($C_1$-$C_{30}$ alkyl)aryl group or a $C_1$-$C_{30}$ O-alkyl group, and the alkyl group may be substituted with a group selected from a phenyl, vinyl, aminopropyl or mercaptopropyl group, the method comprising:

a) sol-gel synthesis of the organic-inorganic hybrid material of 2:1 lamellar structure in the presence of the compound;

b) recovery of the compound encapsulated in the material of general formula I.

The present invention therefore relates to a method of encapsulation in an organic-inorganic hybrid material of 2:1 lamellar structure, said material having the following general formula I:

$$Na_x[(Mg_3)(Al_x(RSi)_{4-x}(OH)_2] \quad (I)$$

in which x is a number such that $0 \leq x < 1.2$ and

R represents a $C_1$-$C_{30}$ alkyl group, advantageously an n-hexadecyl group or a methyl group, in particular an n-hexadecyl group; an aryl group, advantageously a phenyl group; a ($C_1$-$C_{30}$ alkyl)aryl group, advantageously an ethylphenyl group; or a $C_1$-$C_{30}$ O-alkyl group, advantageously an ethoxy group; the alkyl group may be substituted with a group selected from a phenyl, vinyl, aminopropyl or mercaptopropyl group.

"$C_1$-$C_{30}$ alkyl group" means, in the sense of the present invention, any saturated linear or branched alkyl group having from 1 to 30 carbon atoms such as the methyl, ethyl, n-propyl, isopropyl, n-butyl, isobutyl, sec-butyl, tert-butyl, n-pentyl, isopentyl, sec-pentyl, sec-isopentyl, neopentyl, n-hexyl, 2-methylpentyl, 3-methyl pentyl, 2,2-dimethylbutyl, 2,3-dimethylbutyl, n-heptyl, n-octyl, n-nonyl, n-decyl, n-undecyl, n-dodecyl, n-pentadecyl, n-hexadecyl, n-icosyl and n-triacontyl group. Advantageously it is the methyl, ethyl, n-propyl, isopropyl or n-hexadecyl group, even more advantageously the methyl, ethyl, or n-hexadecyl group, more particularly the ethyl or n-hexadecyl group.

The term "aryl group" means, in the sense of the present invention, one or more aromatic rings having 5 to 20 carbon atoms, which may be joined together or fused. In particular, the aryl groups may be monocyclic, bicyclic or polycyclic groups. Preferably it is the phenyl, biphenyl, naphthyl, anthracenyl, phenanthrenyl, tetracenyl, chrysenyl, triphenylenyl, pyrenyl, benzofluorenyl, benzopyrenyl group. Advantageously it is a phenyl group.

The organic-inorganic hybrid material of lamellar structure is of the 2:1 type. It therefore comprises silicates formed by stacks of lamellae that consist of an octahedral layer surrounded on either side by two tetrahedral layers. The atoms of Si and Al (if it is present) are contained in the tetrahedral layer and the Mg atom in the octahedral layer. The Na atom, if present, is contained in the interlayer space. The material may therefore be either of the talc type (when x=0) or of the saponite type (x≠0). Advantageously, it is of the talc type, i.e. x=0.

The source of silicon necessary for synthesis of the material of formula I is advantageously an organoalkoxysilane or a mixture of organoalkoxysilanes of the following general formula II:

$$RSi(OR')_3 \quad (II)$$

in which

R is as defined above and

R' is a methoxy or ethoxy group.

Advantageously, the source of silicon is selected from the group consisting of:

phenyltrimethoxysilane (PhenylTMS) of the following formula (a):

$$phenyl\text{-}Si(OCH_3)_3 \quad (a);$$

tetraethylorthosilicate or tetraethylsilane (TEOS) of the following formula (b):

$$Si(OC_2H_5)_4 \quad (b);$$

hexadecyltrimethoxysilane ($C_{16}$TMS) of the following formula (c):

$$CH_3(CH_2)_{14}CH_2\text{—}Si(OCH_3)_3 \quad (c)$$

methyltriethoxysilane (MTES) of the following formula (d):

$$CH_3\text{—}Si(OCH_3)_3 \quad (e)$$

phenethyltrimethoxysilane of the following formula (e):

$$phenyl\text{-}(CH_2)_2Si(OCH_3)_3 \quad (e)$$

triethoxyphenylsilane of the following formula (f):

$$phenyl\text{-}Si(OC_2H_5)_3 \quad (f);$$

and mixtures thereof.

In particular, it is selected from the group consisting of methyltriethoxysilane, phenyltrimethoxysilane, tetraethylorthosilicate, hexadecyltrimethoxysilane, triethoxyphenylsilane and mixtures thereof, more particularly from the group consisting of phenyltrimethoxysilane, tetraethylorthosilicate, triethoxyphenylsilane hexadecyltrimethoxysilane and mixtures thereof, even more advantageously from the group consisting of phenyltrimethoxysilane, tetraethylorthosilicate, hexadecyltrimethoxysilane and mixtures thereof.

In the case of the mixtures, it may be in particular a mixture of tetraethylorthosilicate with phenyltrimethoxysilane or of tetraethylorthosilicate with hexadecyltrimethoxysilane or of triethoxyphenylsilane with hexadecyltrimethoxysilane, advantageously it is a mixture of tetraethylorthosilicate with hexadecyltrimethoxysilane or of triethoxyphenylsilane with hexadecyltrimethoxysilane, even more advantageously of tetraethylorthosilicate with hexadecyltrimethoxysilane. These mixtures may be prepared in any proportions.

The compound will therefore be encapsulated within the material of formula I and especially if its size allows (of the order of an angstrom) within the interlayer space of the material (this is thus the case with tryptophan and folic acid). The compound according to the invention is selected from the group consisting of at least one active substance, at least one microorganism and mixtures thereof.

"Active substance" means, in the sense of the present invention, any biologically active organic substance, i.e. any organic substance capable of reacting with living organisms, especially plants, and therefore of performing a specific role in metabolism, for example either by acting directly on the plant, or by acting on the soil or the culture substrate, or else by acting on pests or on the contrary on useful organisms. This type of substance may thus allow fertilizing, feeding, stimulating growth and/or prophylaxis of plants and/or improvement of the physical, chemical and/or biological properties of the soil or of the culture substrate of plants. The active substance may be a molecule, but also an extract from plants, an extract from algae, a humic extract or any other types of extracts or byproducts. It may be of natural or synthetic origin, such as a hormone, a protein, an oligosaccharide, a lipid such as an essential oil, an enzyme, an amino acid such as tryptophan, a vitamin such as folic acid or the active substance of a medicinal product or of a phytopharmaceutical product such as a pesticide, fungicide, herbicide, nematicide. In an advantageous embodiment, the active substance is selected from the group consisting of an amino acid, in particular tryptophan, a vitamin, in particular folic acid, an essential oil and mixtures thereof, more advantageously from the group consisting of an amino acid, in particular tryptophan, an essential oil and mixtures thereof; advantageously it is tryptophan.

In a particular embodiment, the compound according to the invention is therefore an active substance. It may also be a mixture of 2, 3 or 4 active substances, in particular of 2 or 3 active substances.

In an advantageous embodiment, a single active substance is encapsulated, such as for example tryptophan or folic acid.

In the case when the encapsulated compound is an active substance, the source of silicon necessary for synthesis of the material of formula I is advantageously phenyltrimethoxysilane or a mixture of organoalkoxysilanes of general formula II, advantageously a mixture of phenyltrimethoxysilane (a) and tetraethylorthosilicate (b). Advantageously, the mixture comprises less than 80 mol % of tetraethylorthosilicate and more than 20 mol % of phenyltrimethoxysilane, more advantageously less than 60 mol % of tetraethylorthosilicate and more than 40 mol % of phenyltrimethoxysilane, even more advantageously less than 50 mol % of tetraethylorthosilicate and more than 50 mol % of phenyltrimethoxysilane, relative to the total number of moles of the mixture.

In an advantageous embodiment, the mixture comprises between 20 and 60 mol % of tetraethylorthosilicate and between 40 and 80 mol % of phenyltrimethoxysilane, in particular between 20 and 40 mol % of tetraethylorthosilicate and between 60 and 80 mol % of phenyltrimethoxysilane, more particularly 20 mol % of tetraethylorthosilicate and 80 mol % of phenyltrimethoxysilane, relative to the total number of moles of the mixture.

In the case when the encapsulated compound is an active substance, step a) comprises the following successive steps:

a1) adding a source of magnesium, advantageously magnesium nitrate hexahydrate, the active substance, the source of silicon, in the case when x≠0, the source of aluminum, advantageously aluminum acetylacetonate, and an optional solvent;

a2) adjusting the pH to between 8 and 14, advantageously between 9 and 12, in particular to 10, for example using NaOH aqueous solution;

a3) stirring the mixture, advantageously for a time between 1 and 24 hours, in particular between 12 and 24 hours, more particularly at least 2 hours, even more particularly at least 12 hours, so as to obtain a gel;

a4) recovering the solid phase of the gel obtained in step a3);

a5) drying the solid phase of the gel obtained in step a4).

The solvent in step a1) may be a polar solvent such as water, alcohol (in particular ethanol or glycerol), propylene glycol, methyl-5-(dimethylamino)-2-methyl-5-oxopentanoate (such as RHODISOLV® Polarclean marketed by Solvay), propylene carbonate or mixtures thereof, advantageously water, alcohol (in particular ethanol or glycerol), methyl-5-(dimethylamino)-2-methyl-5-oxopentanoate (such as RHODISOLV® Polarclean marketed by Solvay) or mixtures thereof, more particularly water, alcohol (in particular ethanol or glycerol) or mixtures thereof. It may be a biosourced and/or biodegradable solvent such as glycerol, propylene glycol, methyl-5-(dimethylamino)-2-methyl-5-oxopentanoate (such as RHODISOLV® Polarclean marketed by Solvay), propylene carbonate or mixtures thereof, in particular glycerol, methyl-5-(dimethylamino)-2-methyl-5-oxopentanoate (such as RHODISOLV® Polarclean marketed by Solvay) or mixtures thereof. It may also be a mixture of alcohol and oil.

In the case when the organic substance comprises an oil or is in liquid form, the solvent in step a1) need not be present.

However, in the case when the active substance is a solid, the solvent in step a1) must be present.

Step a3) may be carried out at a temperature between room temperature and the boiling point of the solvent, advantageously at room temperature.

Step a4) may be carried out by any method familiar to a person skilled in the art, such as by filtration or centrifugation, in particular by centrifugation.

Step a5) may be carried out in a stove, for example at a temperature of 40° C., or by air drying or by lyophilization.

An intermediate step a4)bis may be added between steps a4) and a5), which consists of washing the solid phase of the gel obtained in step a4) with the solvent in step a1).

In another particular embodiment, the compound according to the invention is therefore at least one microorganism. Advantageously the microorganism is selected from the group consisting of a bacterium such as *Bacillus subtilis* (for example accessible under number CIP 52.62 from the Pasteur Institute), a microalga such as Spirulina (for example the cyanobacterium *Arthrospira platensis* marketed under the name SPIRULINA NATURAL by the company EARTHRISE®), a fungus such as *Piriformospora indica* (for example accessible under number DSM 11827 from the Max-Planck-Institut für terrestrische Mikrobiologie), and mixtures thereof, advantageously the microorganism is in the vegetative form, in the encysted form or in the sporulated form, in particular in the vegetative form, more particularly it is a bacterium such as *Bacillus subtilis*, even more particularly in the vegetative form, or a fungus such as *Piriformospora indica*, even more particularly a bacterium such as *Bacillus subtilis*.

The compound according to the invention may therefore consist of a single type of microorganism such as the bacterium *Bacillus subtilis*. It may also consist of a mixture of 2, 3 or 4 different types of microorganisms, in particular of 2 or 3 different types of microorganisms. In an advantageous embodiment, it consists of a single type of microorganism.

In the case when the encapsulated compound is a microorganism, the source of silicon necessary for synthesis of the material of formula I is advantageously selected from the group consisting of methyltriethoxysilane, phenyltrimethoxysilane, triethoxyphenylsilane, hexadecyltrimethoxysilane and mixtures thereof, more advantageously phenyltrimethoxysilane, triethoxyphenylsilane, hexadecyltri methoxysilane and mixtures thereof, even more advantageously it is hexadecyltrimethoxysilane or a mixture of triethoxyphenylsilane and hexadecyltrimethoxysilane, in particular it is hexadecyltrimethoxysilane.

In the case when the encapsulated compound is a microorganism, step a) comprises the following successive steps:

a1) adding a source of magnesium, advantageously magnesium nitrate hexahydrate, the microorganism, a solvent, a source of silicon and in the case when x≠0, the source of aluminum, advantageously aluminum acetylacetonate;

a2) adjusting the pH to between 8 and 14, advantageously between 9 and 12, in particular to 10, for example using NaOH aqueous solution;

a3) stirring the mixture, advantageously for a time between 1 and 24 hours, in particular between 12 and 24 hours, more particularly at least 2 hours, even more particularly at least 12 hours, advantageously 24 hours, so as to obtain a gel.

The method according to the invention may further comprise the following successive steps after step a3):

a4) recovering the solid phase of the gel obtained in step a3);

a5) drying the solid phase of the gel obtained in step a4), advantageously by lyophilization.

The solvent in step a1) may be a polar solvent such as water, alcohol (in particular ethanol or glycerol), propylene glycol, methyl-5-(dimethylamino)-2-methyl-5-oxopentanoate (such as RHODISOLV® Polarclean marketed by Solvay), propylene carbonate or mixtures thereof, advantageously water, alcohol (in particular ethanol or glycerol), propylene glycol, methyl-5-(dimethylamino)-2-methyl-5-oxopentanoate (such as RHODISOLV® Polarclean marketed by Solvay) or mixtures thereof, more particularly water, alcohol (in particular ethanol or glycerol), methyl-5-(di methylamino)-2-methyl-5-oxopentanoate (such as RHODISOLV® Polarclean marketed by Solvay) or mixtures thereof, even more particularly water, alcohol (in particular ethanol or glycerol) or mixtures thereof. It may be a biosourced and/or biodegradable solvent such as glycerol, propylene glycol, methyl-5-(dimethylamino)-2-methyl-5-oxopentanoate (such as RHODISOLV® Polarclean marketed by Solvay), propylene carbonate or mixtures thereof, in particular glycerol, propylene glycol, methyl-5-(dimethylamino)-2-methyl-5-oxopentanoate (such as RHODISOLV® Polarclean marketed by Solvay) or mixtures thereof, more particularly glycerol, methyl-5-(di methylamino)-2-methyl-5-oxopentanoate (such as RHODISOLV® Polarclean marketed by Solvay) or mixtures thereof. It may also be a mixture of alcohol and oil.

In an advantageous embodiment and especially when the microorganism is in the vegetative form, the microorganism in step a1) is in the form of a preculture of said microorganism, advantageously having a content of microorganism between $10^3$ and $10^{10}$ CFU/ml, in particular between $10^6$ and $10^9$ CFU/ml, advantageously $10^8$ CFU/ml.

In this case, the method according to the invention may also comprise a preliminary step before step a) of preparing the preculture of microorganism. This step may be carried out by methods that are familiar to a person skilled in the art. It comprises in particular seeding the microorganism in a nutrient medium and incubation for a sufficient length of time to obtain the desired concentration of microorganism.

Step a3) may be carried out at room temperature.

Step a4) may be carried out by any method familiar to a person skilled in the art, such as by filtration or centrifugation, in particular by centrifugation.

An intermediate step a4)bis may be added between steps a4) and a5), which consists of washing the solid phase of the gel obtained in step a4) with the solvent of step a1).

Another step a4) ter may also be added between steps a4) or a4)bis and a5), which consists of deep-freezing the solid phase of the gel obtained in step a4) or in step a4)bis, if the latter is carried out.

Step a5) may be carried out in a stove, for example at a temperature of 40° C., or by air drying or by lyophilization. Advantageously it is carried out by lyophilization.

The method according to the invention may be carried out in a bioreactor.

The present invention further relates to a compound encapsulated in an organic-inorganic hybrid material of 2:1 lamellar structure, said material having general formula I as described above, the encapsulated compound being selected from the group consisting of at least one active substance, at least one microorganism and mixtures thereof.

The material, the active substance and the microorganism are as described above.

Advantageously, the encapsulated compound is obtainable, in particular is obtained, by the method according to the invention as described above.

The rate of encapsulation is advantageously at least 20 mg of compound/g of material, more advantageously at least 30 mg of compound/g of material, even more advantageously at least 40 mg of compound/g of material, in particular at least 50 mg of compound/g of material, more particularly at least 60 mg of compound/g of material, even more particularly at least 65 mg of compound/g of material.

The encapsulated microorganism may be revived by methods that are familiar to a person skilled in the art, such as for example by seeding on solid nutrient medium (Petri dish) or liquid nutrient medium (bioreactor). The encapsulated compound may be stored for between 0 and 12 months at a temperature between 4° C. and room temperature.

When the compound is a microorganism or comprises a microorganism, it must be stored at a temperature of 4° C.

The present invention further relates to a composition, in particular phytopharmaceutical, advantageously intended for fertilizing, feeding, stimulating growth and/or prophylaxis of plants and/or improvement of the physical, chemical and/or biological properties of the soil or of the culture substrate of the plants, comprising the compound encapsulated in an organic-inorganic hybrid material of 2:1 lamellar structure according to the invention.

This composition comprises any excipient suitable for administration to a plant or to the soil or the culture substrate of plants, whether it is for example by application to the leaves, to the roots, in the open or outside the soil. In particular it is a phytopharmaceutically acceptable excipient.

In the sense of the present invention, "phytopharmaceutically acceptable" means acceptable for use on the plants or the soil, i.e. does not pollute the environment and is not toxic to humans (users).

It may further comprise other active compounds having a synergistic or supplementary action on the plant or the soil or culture substrate of the plants, such as for example nutrients advantageously selected from the group consisting of nitrogen, phosphorus, potassium, calcium, magnesium, silicon, trace elements and mixtures thereof, organic raw materials and/or mineral raw materials, pesticides, fungicides, herbicides, nematicides, hormones, humic substances, extracts from algae, amino acids, extracts from plants, salicylic acid and the precursors or analogs of salicylic acid, nitric oxide and the precursors or analogs of nitric oxide, cyclic nucleotides and mixtures thereof.

This composition may therefore be in the form of a fertilizer or a biostimulant.

It may be in solid form, in particular in the form of powder, granules or microgranules, in liquid form or in the form of gel.

Thus, it may for example be in solid form of the powder, granule or microgranule type in fertilizers or culture substrates for feeding or stimulating plants for use in the open or for localized use.

It may also be in liquid or gel form of fertilizers or biostimulants for use in foliar or root application.

It may moreover be in the form of a water-soluble fertilizer for use in fertigation in the open or outside the soil.

It may moreover be in a solid or liquid form of amendment for improving the physical, chemical or biological properties of the soil or of the culture substrate.

It may be a composition of the phytosanitary type or a composition of the biocontrol type, PNPP (préparations naturelles préoccupantes—natural products of little concern), SDN (stimulation des defenses naturelles—stimulation of natural defenses), SDP (stimulation des defenses des plantes—stimulation of plants' defenses), in the case of prophylaxis of plants.

The compositions according to the invention may therefore be used:
- by direct application on a soil, on the whole surface of the soil or, preferably, localized in the region of the roots of the plants to be treated; or
- by application at the level of the leaves and/or plants to be treated, by any suitable means of distribution, for example such as by spraying in the case of a liquid formulation.

These compositions may moreover be introduced into the water irrigation system and/or in fertilizer formulations.

Generally, the amount of composition to be used depends on the nature of the plant to be treated, the nature of the encapsulated compound and the method of administration envisaged.

A person skilled in the art will be able to adapt the amounts to be used as a function of the manner of application selected. In particular, relatively smaller amounts are used when the composition is applied in the region of the roots whereas relatively larger amounts are used when the composition is applied on the whole surface of the soil.

These compositions may be used in a single application or else in sequential application.

The present invention relates finally to the use of the compound according to the present invention or of the composition according to the present invention for fertilizing, feeding, stimulating growth and/or prophylaxis of plants and/or improvement of the physical, chemical and/or biological properties of the soil or of the culture substrate of plants, advantageously of plants that are cultivated or are of agronomic interest.

In particular, said use may be implemented by application to the leaves, to the roots, in the open or outside the soil.

In fact, the bacterium *Bacillus subtilis* makes it possible to stimulate the growth of plants and it protects them against biotic stress (pathogens) and abiotic stress (lack of water). It makes it possible for water-insoluble phosphated forms of phosphorus to be dissolved in water.

The fungus *Piriformospora indica* improves plants' capacity to tolerate environmental stresses, it stimulates plant growth and promotes absorption of nutrients.

Tryptophan is a precursor to the production of auxin, a hormone that regulates root development in particular.

Essential oil, in particular of thyme, is a stimulator of the natural defenses. Spirulina is a producer of chemical compounds having a biological action on plants.

Folic acid allows inhibition of the development of the primary roots and increased development as well as maturation of the secondary roots (horizontal elongation) by redistribution of auxin (growth hormone) in the primary roots.

The present invention will be better understood on reading the description of the drawings and the following examples, which are given as a guide and are nonlimiting.

Figure 3:
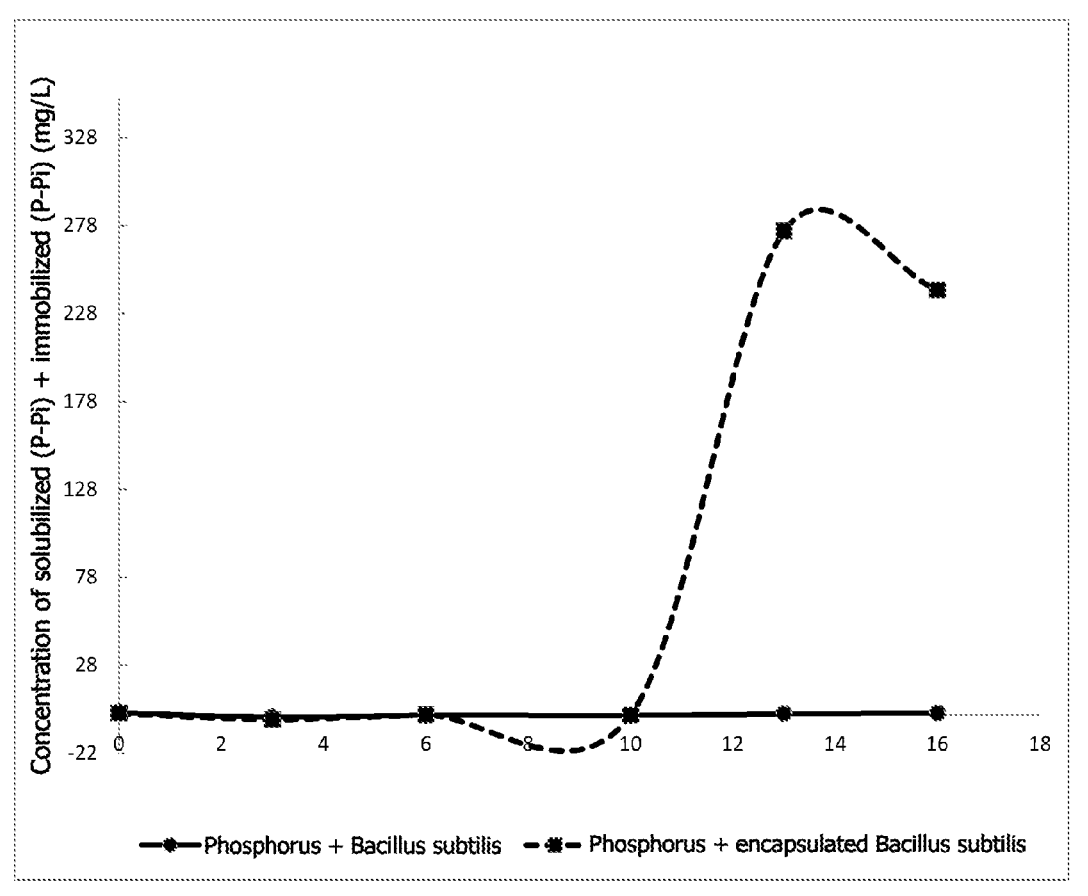

FIG. 3 shows the difference in concentration between solubilized phosphorus and phosphorus immobilized by the bacterial flora as a function of time (in days) in the presence of *Bacillus subtilis* CIP 52.62, encapsulated (compound according to the invention) and unencapsulated, in the conditions of example 3.

COMPARATIVE EXAMPLE 1

Figure 1:
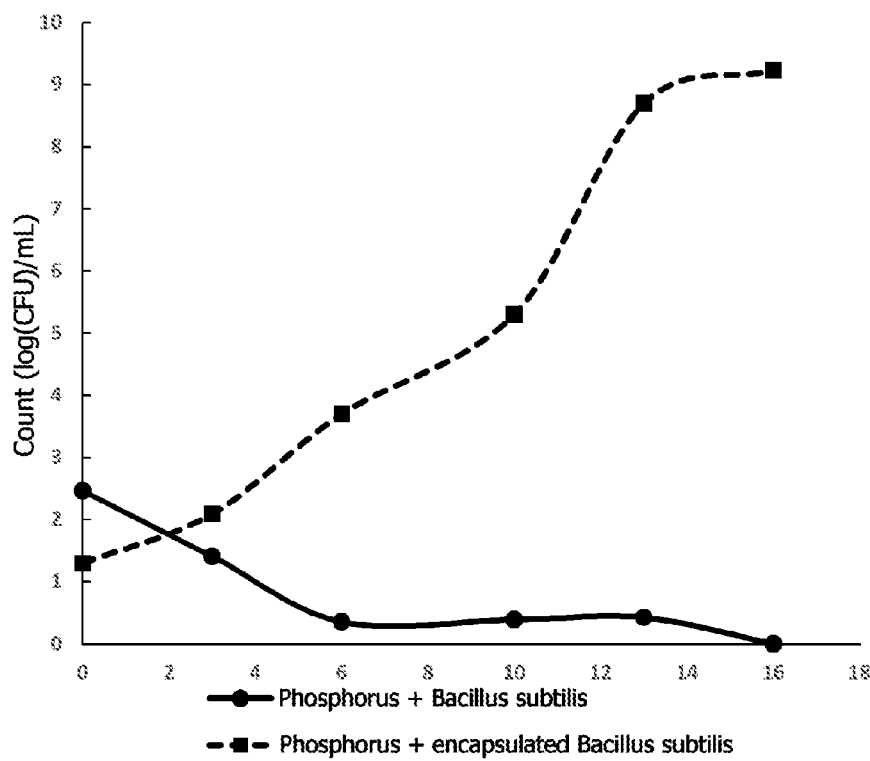
FIG. 1 shows monitoring over time (in days) of the population (in CFU/ml) of *Bacillus subtilis* CIP 52.62, encapsulated (compound according to the invention) and unencapsulated, in the presence of phosphorus in the conditions of example 3.

Effect of Various Biodegradable Solvents and of Ethanol on the Chemical Synthesis of Organic-Inorganic Compounds of the Lamellar Type In a 1000 mL beaker, addition of 19.44 g of magnesium nitrate hexahydrate ($MgNO_3$, $6H_2O$) (99%, Sigma) and 200 mL of biodegradable solvent (Glycerol (Quaron >99.5%) or propylene glycol (VWR) or methyl-5-(dimethylamino)-2-methyl-5-oxopentanoate (RHODISOLV® Polarclean marketed by Solvay) or propylene carbonate (Quaron >99.7%)) or ethanol with stirring at 55° C. at 220 rpm for 15 minutes. Addition, with stirring for 15 minutes, of 4.58 g of triethoxyphenylsilane (97%, Sigma) and 15.42 g of hexadecyltrimethoxysilane ($C_{16}TMS$) (>85%, Sigma). Addition of 100 mL of 1M NaOH (97%, Sigma) and stirring for 24 h. After 15 days of storage at ambient temperature and relative humidity, in the dark, each synthesis is monitored to validate proper formation of the compounds and certain physicochemical properties (pH, viscosity, appearance, volume, stability) (Table 1). A product is considered to be stable if there is no apparent change in appearance and viscosity and if there is no phase separation or decanting.

TABLE 1 physicochemical properties of the lamellar materials

| | Solvents | | | | |
|---|---|---|---|---|---|
| | Ethanol | Glycerol | Propylene glycol | Propylene carbonate | Polarclean |
| Final volume (mL) | 316 | 357 | 392 | 733 | 442 |
| pH | 9.84 | 9.75 | 11.1 | 8.45 | 10.1 |
| Viscosity (cP) | 4.68 | 15.9 | 18.9 | 4.41 | 10.5 |
| Appearance | milky | milky | Milky | milky | milky |
| Stability at 4° C. at 15 d | Stable | Stable | Stable | Stable | Stable |
| Stability at room temperature at 15 d | Stable | Stable | Stable | Stable | Stable |

It can be seen from the results that the use of biodegradable solvents or of ethanol during the syntheses therefore does not have an adverse effect on formation of the compounds. Ethanol can be replaced with glycerol, propylene glycol, propylene carbonate or methyl-5-(dimethylamino)-2-methyl-5-oxopentanoate (RHODISOLV® Polarclean marketed by Solvay).

EXAMPLE 1: ENCAPSULATION OF AN ACTIVE MOLECULE

Example 1.1: Encapsulation of Tryptophan a) Compound 100% Phenyl TRYPTO 1.944 g of magnesium nitrate hexahydrate (99%, Sigma Aldrich) is added to 20 mL of absolute ethanol (99.9%, Carlo Erba), and the mixture is stirred until completely dissolved. 200 mg of L-tryptophan (>98%, Sigma Aldrich) is introduced with stirring and then 2 g of phenyltrimethoxysilane (PhenylTMS) (98%, ABCR) is added. The whole is stirred and then the solution pH is adjusted to a value of 10 by adding 15 mL of an aqueous solution of sodium hydroxide (>97%, Sigma Aldrich) with a concentration of 1M. After stirring at room temperature for 24 h, the solid is separated from the solution by centrifugation (speed of 10000 rpm for 10 min). The solid is washed three times with ethanol before being dried in a stove at 40° C. for 48 h. The compound obtained is then ground in an agate mortar before being characterized. 1.35 g of compound designated 100% phenyl TRYPTO is recovered.

The X-ray diffraction pattern of the sample has several diffraction peaks in the angle domains 2-10°2 theta, 15-25°2 theta, 30-40°2 theta and 55-652 theta. These peaks correspond respectively to reflections on the (001), (020; 110), (130; 220) and (060:330) lattice planes, characteristic of the presence of a lamellar phase. The value of the periodicity $d_{060}$ is 0.156 nm, a typical value for a lamellar phase of the hybrid organic-inorganic type with a structure of the talc type of formula $Mg_3(RSi)_4O_8(OH)_2$ in which R represents a phenyl group. The periodicity $d_{001}$ is of the order of 1.32 nm.

The amount of tryptophan in the compound (rate of encapsulation) was determined by UV spectrophotometry at a wavelength of 280 nm. The compound comprises 63.4 mg of tryptophan per g of material. Analysis by thermogravimetry, carried out under air between 30 and 800° C. at a rate of temperature rise of 5° C./min, shows that the greatest weight loss (decomposition of the products) only begins starting from 300° C., which confirms that the tryptophan has been properly encapsulated in the material (Table 2).

TABLE 2 result of thermogravimetric analyses carried out under nitrogen and under air

| Sample | Peaks (° C.) | Range used (° C.) | Weight loss (%) |
|---|---|---|---|
| | | Under $N_2$ | |
| 100% Phenyl TRYPTO | 80 | 30-200 | 6.81 |
| | 358-480 | 200-800 | 43.83 |
| | | Under air | |
| | 70 | 30-200 | 6.84 |
| | 364-450-604 | 200-800 | 45.24 |

Comparison between the NMR spectrum of the solid of the $^{13}C$ of tryptophan alone and of the compound 100% Phenyl TRYPTO indicates the presence of a broad resonance at about 111 ppm, attributed to the presence of tryptophan. The mobility of the latter is greatly reduced, which shows that the tryptophan is present in the interlayer space. Therefore we have indeed obtained tryptophan encapsulated in an organic-inorganic hybrid material of 2:1 lamellar structure of formula $Mg_3(RSi)_4O_8(OH)_2$.

b) Compound 80Ph-20TEOS TRYPTO 2 g of magnesium nitrate hexahydrate (99%, Sigma Aldrich) is added to 20 mL of absolute ethanol (99.9%, Carlo Erba), and the mixture is stirred until completely dissolved. 200 mg of L-tryptophan (>98%, Sigma Aldrich) is added with stirring and then a mixture consisting of 1.646 g of phenyltrimethoxysilane (PhenylTMS) (98%, ABCR) and 0.432 g tetraethylsilane (TEOS) (98%, ABCR) is added (mixture, by weight, of 79.2% of PhenylTMS and 20.8% of TEOS, which represents 80% of PhenylTMS and 20% of TEOS in mol). The whole is stirred and then the solution pH is adjusted to a value of 10 by adding 15 mL of an aqueous solution of sodium hydroxide (>97%, Sigma Aldrich) with a concentration of 1M. After stirring at room temperature for 24 h, the solid is separated from the solution by centrifugation (speed of 10000 rpm for 10 min). The solid is washed three times with ethanol before being dried in a stove at 40° C. for 48 h. The compound obtained is then ground in an agate mortar before being characterized. 1.43 g of compound designated 80Ph-20TEOS TRYPTO is recovered.

The X-ray diffraction pattern of the sample has several diffraction peaks in the angle domains 2-10°2 theta, 15-25°2 theta, 30-40°2 theta and 55-65°2 theta. These peaks correspond respectively to reflections on the (001), (020; 110), (130; 220) and (060:330) lattice planes, characteristic of the presence of a lamellar phase. The value of the periodicity $d_{006}$ is 0.156 nm, a typical value for a lamellar phase of the hybrid organic-inorganic type with a structure of the talc type of formula $Mg_3(RSi)_4O_8(OH)_2$ in which R represents a mixture of phenyl group and O-ethyl group. The periodicity $d_{001}$ is equal to 1.4 nm.

The amount of tryptophan in the compound (rate of encapsulation) was determined by UV spectrophotometry at a wavelength of 280 nm; the compound comprises 68.7 mg of tryptophan per g of material.

Analysis by thermogravimetry, carried out under air between 30 and 800° C. at a rate of temperature rise of 5° C./min, shows that the greatest weight loss (decomposition of the products) only begins starting from 300° C., which confirms that the tryptophan has been properly encapsulated in the material (Table 3).

TABLE 3 result of the thermogravimetric analyses carried out under nitrogen and under air

| Sample | Peaks(° C.) | Range used (° C.) | Weight loss (%) |
|---|---|---|---|
| | | Under $N_2$ | |
| 80Ph—20TEOS TRYPTO | 80 | 30-200 | 8.47 |
| | 358-480 | 200-800 | 39.32 |
| | | Under air | |
| | 69 | 30-200 | 8.30 |
| | 364-450 | 200-800 | 41.30 |

Comparison between the NMR spectrum of the solid of the $^{13}C$ of the tryptophan alone and of the compound 80Ph-20TEOS TRYPTO indicates the presence of a broad resonance at about 111 ppm, attributed to the presence of tryptophan. The mobility of the latter is greatly reduced, a sign that the tryptophan is present in the interlayer space.

Therefore tryptophan encapsulated in an organic-inorganic hybrid material of 2:1 lamellar structure of formula $Mg_3(RSi)_4O_8(OH)_2$ is indeed obtained.

c) Compounds MTES TRYPTO, $C_{16}$TMS TRYPTO, TEOS TRYPTO, 20Ph-80TEOS TRYPTO, 40Ph-60TEOS TRYPTO and 60Ph-40TEOS TRYPTO Using a method identical to that used for preparing the compound 100% Phenyl TRYPTO, other compounds according to the invention were prepared by replacing phenyltrimethoxysilane as the source of silicon with methyltriethoxysilane (MTES) or hexadecyltrimethoxysilane ($C_{16}$TMS) or tetraethylsilane (TEOS). The compounds obtained were named MTES TRYPTO, $C_{16}$TMS TRYPTO and TEOS TRYPTO, respectively.

Using a method identical to that used for preparing the compound 80Ph-20TEOS TRYPTO, other compounds according to the invention were prepared by replacing the mixture 20% TEOS and 80% PhenylTMS as the source of silicon with a mixture 80% TEOS and 20% PhenylTMS in mol, a mixture 60% TEOS and 40% PhenylTMS in mol and a mixture 40% TEOS and 60% PhenylTMS in mol. The compounds obtained were named 20Ph-80TEOS TRYPTO, 40Ph-60TEOS TRYPTO and 60Ph-40TEOS TRYPTO, respectively.

The amount of compounds recovered and the rates of encapsulation determined by UV spectrophotometry at a wavelength of 280 nm are presented in Table 4 below.

TABLE 4

| Compound | source of silicon | mass recovered (g) | rate of encapsulation (mg tryptophan/g of material) |
|---|---|---|---|
| MTES TRYPTO | MTES | 1.123 | 45.9 |
| $C_{16}$TMS TRYPTO | $C_{16}$TMS | 1.173 | 24.7 |
| TEOS TRYPTO | TEOS | 1.074 | 23.4 |
| 20Ph—80TEOS TRYPTO | 20Ph—80TEOS | 1.36 | 37.6 |
| 40Ph—60TEOS TRYPTO | 40Ph—60TEOS | 1.49 | 48.9 |
| 60Ph—40TEOS TRYPTO | 60Ph—40TEOS | 1.36 | 58 |

The X-ray diffraction pattern of the samples of each of the compounds has several diffraction peaks in the angle domains 2-10°2 theta, 15-25°2 theta, 30-40°2 theta and 55-65°2 theta. These peaks correspond respectively to reflections on the (001), (020; 110), (130; 220) and (060: 330) lattice planes, characteristic of the presence of a lamellar phase. The value of the periodicity $d_{006}$ is 0.156 nm, a typical value for a lamellar phase of the hybrid organic-inorganic type with a structure of the talc type of formula $Mg_3(RSi)_4O_8(OH)_2$. The periodicity $d_{001}$ is equal to 1.4 nm.

Comparison between the NMR spectrum of the solid of the $^{13}C$ of the tryptophan alone and of the compounds according to the invention indicates the presence of a broad resonance at about 111 ppm, attributed to the presence of tryptophan. The mobility of the latter is greatly reduced, a sign that the tryptophan is present in the interlayer space.

Therefore, for each compound according to the invention, tryptophan encapsulated in an organic-inorganic hybrid material of 2:1 lamellar structure of formula $Mg_3(RSi)_4O_8(OH)_2$ is indeed obtained.

In the case when the source of silicon is a mixture of TEOS and PhenylTMS, we observe a linear correlation between the amount of tryptophan encapsulated and the percentage of TEOS used, except for the case when the content of TEOS is 0% (compound 100% Phenyl TRYPTO).

Example 1.2: Encapsulation of an Essential Oil 2 g of magnesium nitrate hexahydrate (99%, Sigma Aldrich) is added to 20 mL of a mixture made up of absolute ethanol (99.9%, Carlo Erba) and oil (Greenfix 3000) in proportions equal to 0, 25, 75 or 100 vol % of oil. The mixture is stirred until completely dissolved. 1.646 g of phenyltrimethoxysilane (98%, ABCR) and 0.432 g of tetraethylsilane (98%, ABCR) are then added (mixture, by weight, of 79.2% of PhenylTMS and 20.8% of TEOS, which represents 80% of PhenylTMS and 20% of TEOS in mol). The whole is stirred and then the solution pH is adjusted to a value of 10 by adding 15 mL of an aqueous solution of sodium hydroxide (>97%, Sigma Aldrich) with a concentration of 1M. After stirring at room temperature for 24 h, the solid is separated from the solution by centrifugation (speed of 10000 rpm for 10 min). The solids are washed three times with ethanol before being dried in a stove at 40° C. for 48 h. The compounds obtained are then ground in an agate mortar before being characterized and are called SHE5 (25% of oil), SHE15 (75% of oil), SH20 (100% of oil) and 80% P-20% T (0% of oil). The amounts obtained for the different samples are 2.24 g, 2.62 g, 0.12 g and 1.43 g, respectively.

Comparison between the X-ray diffraction patterns of the samples SHE5 (25% of oil), SHE15 (75% of oil), SH20 (100% of oil) and 80% P-20% T (0% of oil) shows the presence of diffraction peaks in the angle domains 2-10°2 theta, 15-25°2 theta, 30-40°2 theta and 55-65°2 theta. These peaks correspond respectively to reflections on the (001), (020; 110), (130; 220) and (060:330) lattice planes, characteristic of the presence of a lamellar phase. The value of the periodicity $d_{060}$ is 0.156 nm, a typical value for a lamellar phase of the hybrid organic-inorganic type of structure of the talc type. The periodicities $d_{001}$ are of the order of 1.4 nm. It should be noted that the intensity of the diffraction peaks decreases with the oil content in the mixture.

Analysis by thermogravimetry, carried out under air between 30 and 800° C. at a rate of temperature rise of 5° C./min, shows that the greatest weight loss (decomposition of the products) only begins starting from 300° C., which confirms that the oil has been properly encapsulated in the material (Table 5).

TABLE 5 result of the thermogravimetric analyses carried out under nitrogen and under air

| Sample | Peaks (° C.) | Range used (° C.) | Weight loss (%) |
|---|---|---|---|
| | Under $N_2$ | | |
| SHE5 | 67 | 30-200 | 12.95 |
| | 361 | 200-800 | 37.86 |
| | Under air | | |
| | 76 | 30-200 | 12.69 |
| | 339 | 200-800 | 45.24 |
| | Under $N_2$ | | |
| SHE15 | 74 | 30-200 | 14.02 |
| | 345-521 | 200-800 | 38.46 |
| | Under air | | |
| | 75 | 30-200 | 13.89 |
| | 339-460-598-761 | 200-800 | 55.60 |
| | Under $N_2$ | | |
| SHE20 | 46 | 30-200 | 8.76 |
| | 349-597 | 200-800 | 36.83 |
| | Under air | | |
| | 50 | 30-200 | 8.58 |
| | 353-599 | 200-800 | 55.94 |

Example 1.3: Encapsulation of Folic Acid a) With Ethanol as Solvent 1.60 g of magnesium nitrate hexahydrate (99%, Sigma Aldrich) is added to 20 mL of absolute ethanol (99.9%, Carlo Erba), and the mixture is stirred until completely dissolved. 200 mg of folic acid (>97%, Sigma Aldrich) is introduced with stirring and then 2 g of phenyltrimethoxysilane (PhenylTMS) (98%, Sigma Aldrich) is added. The whole is stirred and then the solution pH is adjusted to a value of 10 by adding 10 mL of an aqueous solution of sodium hydroxide (>97%, Sigma Aldrich) with a concentration of 1M. After stirring at room temperature for 24 h, the solid is separated from the solution by centrifugation (speed of 10000 rpm for 10 min). The solid is dried in a stove at 60° C. for 24 h. The compound obtained (2.1 g) is then ground in an agate mortar before being characterized and is designated Eth-PH 200AF in situ.

The X-ray diffraction pattern of the sample has several diffraction peaks in the angle domains 2-10°2 theta, 15-25°2 theta, 30-40°2 theta and 55-65°2 theta. These peaks correspond respectively to reflections on the lattice planes (001), (020; 110), (130; 220) and (060; 330), characteristic of the presence of a lamellar phase. The value of the periodicity $d_{060}$ is 0.156 nm, a typical value for a lamellar phase of the hybrid organic-inorganic type with a structure of the talc type of formula $Mg_3(RSi)_4O_8(OH)_2$ in which R represents a phenyl group. The periodicity door is of the order of 1.14 nm.

The amount of folic acid in the compound (rate of encapsulation) was determined by UV spectrophotometry at a wavelength of 280 nm; the compound comprises 108.3 mg of folic acid per g of material. Analysis by thermogravimetry, carried out under air between 30 and 800° C. at a rate of temperature rise of 5° C./min, shows that the greatest weight loss (decomposition of the products) only begins starting from 300° C., which confirms that the folic acid has been properly encapsulated in the material (Table 6).

TABLE 6 result of the thermogravimetric analyses carried out under nitrogen and under air

| Peaks (° C.) | Range used (° C.) | Weight loss (%) |
|---|---|---|
| Under $N_2$ | | |
| 80 | 30-200 | 4.8 |
| 375-400-505-620 | 200-800 | 45.5 |
| Under air | | |
| 70 | 30-200 | 5.2 |
| 385-545-620 | 200-800 | 56.4 |

Comparison between the NMR spectrum of the solid of the $^{13}C$ of the folic acid alone and of the reference compound Eth-PH 200AF in situ indicates the presence of broad resonances at about 46, 97, 112, 150 and 166 ppm, attributed to the presence of folic acid. The mobility of the latter is greatly reduced, a sign that folic acid is present in the interlayer space. Therefore folic acid encapsulated in an organic-inorganic hybrid material of 2:1 lamellar structure of formula $Mg_3(RSi)_4O_8(OH)_2$ is indeed obtained.

b) With Glycerol as Solvent 1.60 g of magnesium nitrate hexahydrate (99%, Sigma Aldrich) is added to 20 mL of glycerol (87%, Fluka), and the mixture is stirred until completely dissolved. 200 mg of folic acid (>97%, Sigma Aldrich) is introduced with stirring and then 2 g of phenyltrimethoxysilane (PhenylTMS) (98%, Sigma Aldrich) is added. The whole is stirred and then the solution pH is adjusted to a value of 10 by adding 10 mL of an aqueous solution of sodium hydroxide (>97%, Sigma Aldrich) with a concentration of 1M. After stirring at room temperature for 24 h, the solid is separated from the solution by centrifugation (speed of 10000 rpm for 10 min). The solid is washed four times with demineralized water before being dried in a stove at 60° C. for 24 h. The compound obtained (2.2 g) is then ground in an agate mortar before being characterized and is designated Gly-PH 200AF in situ.

The X-ray diffraction pattern of the sample has several diffraction peaks in the angle domains 2-10°2 theta, 15-25°2 theta, 30-40°2 theta and 55-65° 2 theta. These peaks correspond respectively to reflections on the lattice planes (001), (020; 110), (130; 220) and (060; 330), characteristic of the presence of a lamellar phase. The value of the periodicity $d_{060}$ is 0.155 nm, a typical value for a lamellar phase of the hybrid organic-inorganic type with a structure of the talc type of formula $Mg_3(RSi)_4O_8(OH)_2$ in which R represents a phenyl group. The periodicity $d_{001}$ is of the order of 1.24 nm.

The amount of folic acid in the compound (rate of encapsulation) was determined by UV spectrophotometry at a wavelength of 280 nm; the compound comprises 56.66 mg of folic acid per g of material. Analysis by thermogravimetry, carried out under air between 30 and 800° C. at a rate of temperature rise of 5° C./min, shows that the greatest weight loss (decomposition of the products) only begins starting from 300° C., which confirms that the folic acid has been properly encapsulated in the material (Table 7).

TABLE 7 result of the thermogravimetric analyses carried out under air

| Peaks (° C.) | Range used (° C.) | Weight loss (%) |
|---|---|---|
| 70 | 30-200 | 7.3 |
| 380-620 | 200-800 | 46.2 |

Comparison between the NMR spectrum of the solid of the $^{13}C$ of the folic acid alone and of the reference compound Gly-PH 200AF in situ indicates the presence of a broad resonance at about 46, 97, 112, 150 and 166 ppm, attributed to the presence of folic acid. The mobility of the latter is greatly reduced, a sign that folic acid is present in the interlayer space. Therefore folic acid encapsulated in an organic-inorganic hybrid material of 2:1 lamellar structure of formula $Mg_3(RSi)_4O_8(OH)_2$ is indeed obtained.

EXAMPLE 2: ENCAPSULATION OF A MICROORGANISM

Example 2.1: Encapsulation of *Bacillus subtilis* a) Compound 100% Phenyl BS

A preculture of *Bacillus subtilis* (accessible under number CIP 52.62 from the Pasteur Institute) is prepared from cryotubes containing 400 µL of a suspension of *Bacillus subtilis* maintained at −20° C. in 1.6 mL of glycerol. The nutrient medium in which the contents of the cryotube are incorporated is an LB broth (lysogeny broth). It is made up of 10 g of tryptone (peptone of the casein pancreatic hydrolyzate type), 5 g of yeast extract and 10 g of NaCl to one liter of demineralized water. The yeast extract is obtained from yeast autolyzates. It is biomass of yeasts in suspension induced to autolysis by passage at 50° C. for several hours, from which the liquid phase is recovered. This medium is prepared directly in conical flasks and then is autoclaved for 20 minutes at 121° C. Seeding is then effected by flame to prevent any contamination. A solid medium count on a Petri dish (90 mm diameter) is carried out after 18 h of incubation at 37° C. to determine the initial concentration of bacterium that is added during the synthesis.

Synthesis is carried out in a bioreactor. The first step consists of cleaning the bioreactor with absolute ethanol. The preculture is fed into the bioreactor (to 10% of the final volume, i.e. 200 mL of LB medium containing the bacteria at a content of $10^3$ CFU/ml). In a 2 L bottle, 97 g of magnesium nitrate (99%, Sigma Aldrich) is dissolved in a liter of absolute ethanol (99.9%, Carlo Erba). 100 g of phenyltrimethoxysilane (PhenylTMS) (98%, ABCR) is then added to this solution and then the whole is poured into the bioreactor. A portion of the soda is quickly introduced manually, up to about pH=9.5, and then the remainder is added gradually by pump until pH=10 is reached (volume of 1M aqueous solution of soda: 750 mL). After stirring for 24 h, the gel is centrifuged for 10 minutes at a speed of 9500 rpm, washed three times with demineralized water and then the pellet is frozen before being lyophilized. The sample thus prepared is called 100% Phenyl BS and contains the same amount of bacterium as at the start.

Characterization of the sample by X-ray diffraction indicates formation of a lamellar phase of the organic-inorganic type with a structure of the talc type of formula $Mg_3(RSi)_4O_8(OH)_2$ in which R represents a phenyl group (presence of the reflections characteristic of the lattice planes (001), (020,110), (130,220) and (060)) with a periodicity $d_{001}$ equal to 1.3 nm. Few isolated bacteria are observable on the photographs from scanning electron microscopy. The latter are embedded in the agglomerates.

b) Compound $C_{16}$TMS BS

A preculture of *Bacillus subtilis* (accessible under number CIP 52.62 from the Pasteur Institute) is prepared from cryotubes containing 400 µL of a suspension of *Bacillus subtilis* maintained at −20° C. in 1.6 mL of glycerol. The nutrient medium in which the contents of the cryotube are incorporated is an LB broth (lysogeny broth) as described above. This medium is prepared directly in conical flasks and then is autoclaved for 20 minutes at 121° C. Seeding is then effected by flame to prevent any contamination. A solid medium count on a Petri dish (90 mm diameter) is carried out after 18 h of incubation at 37° C. to determine the initial concentration of bacterium that is added during the synthesis ($10^3$ CFU/ml).

Synthesis is carried out in a bioreactor. The first step consists of cleaning the bioreactor with absolute ethanol. The preculture is fed into the bioreactor (to 10% of the final volume, i.e. 200 mL of LB medium containing the bacteria). In a 2 L bottle, 55.65 g of magnesium nitrate hexahydrate (99%, Sigma Aldrich) is dissolved in a liter of absolute ethanol (99.9%, Carlo Erba). 100 g of hexadecyltrimethoxysilane ($C_{16}$TMS) (>85%, Sigma) is then added to this solution and then the whole is poured into the bioreactor. A portion of the soda is quickly introduced manually, up to about pH=9.5, and then the remainder is added gradually by pump until pH=10 is reached (volume of 1M soda solution: 450 mL). Once this pH is reached, the pump is stopped. After stirring for 24 h, the gel is centrifuged for 10 minutes at a speed of 9500 rpm, washed three times with demineralized water and then the pellet is frozen before being lyophilized. The sample thus prepared has the reference $C_{16}$TMS BS. The amount of bacterium present in the sample is $10^2$ CFU/ml.

Characterization of the sample by X-ray diffraction indicates formation of a lamellar phase of the organic-inorganic type with a structure of the talc type of formula $Mg_3(RSi)_4O_8(OH)_2$ in which R represents a group $CH_3(CH_2)_{14}CH_2$ ((presence of the reflections characteristic of the lattice planes (001), (020,110), (130,220) and (060)) with a periodicity $d_{001}$ equal to 1.5 nm.

Few bacteria are observable on the photographs from scanning electron microscopy; the latter are embedded in the agglomerates.

c) Compound $C_{16}$TMS—Triethoxyphenylsilane c1) Effect of Different Biodegradable Solvents in Ethanol Substitution on the Viability of *Bacillus subtilis* after Synthesis In a 500 mL beaker, addition of 9.72 g of magnesium nitrate hexahydrate ($MgNO_3$, $6H_2O$) (99%, Sigma Aldrich) and 100 mL of biodegradable solvent (Glycerol (Quaron >99.5%) or propylene glycol (VWR) or methyl-5-(dimethylamino)-2-methyl-5-oxopentanoate (RHODISOLV® Polarclean marketed by Solvay) with stirring at 55° C. at 220 rpm for 15 minutes. Addition, with stirring for 15 minutes, of 7.71 g of triethoxyphenylsilane (97%, Sigma Aldrich) and 2.29 g of hexadecyltrimethoxysilane (>85%, Sigma). Addition of 20 mL of culture medium of *Bacillus subtilis* (accessible under number CIP 52.62 from the Pasteur Institute) at $6.50×10^7$ CFU/ml (the culture medium was prepared in a 3 L bioreactor by seeding *Bacillus subtilis* in 20 mL of BHI medium (OXOID) and then incubation for 18-24 h at 30° C., 200 rpm). Addition of 70 mL of 1M NaOH (>97%, Sigma Aldrich) (pH 10) and stirring for 24 h. A solid medium count on a Petri dish (90 mm diameter) is carried out at 37° C. in the dark with 60% relative humidity to determine the concentration of microorganisms at To ($N_0$), To+24 h ($N_{24\,h}$) and To+14 days ($N_{14d}$) after synthesis. The results are presented in Table 8 below.

TABLE 8 concentration of microorganisms at To ($N_0$), To + 24 h ($N_{24\,h}$) and To + 14 days ($N_{14\,d}$) after synthesis as a function of the solvent used for synthesis

| | Bacillus subtilis (CFU/ml) | | |
|---|---|---|---|
| | $N_0$ | $N_{24\,h}$ | $N_{14\,d}$ |
| Glycerol | $1.4 \times 10^6$ | $1.4 \times 10^6$ | $1.2 \times 10^6$ |
| Propylene glycol | $3.1 \times 10^6$ | $1.4 \times 10^6$ | $1.5 \times 10^6$ |
| Polarclean | $2.9 \times 10^6$ | $1.2 \times 10^6$ | $7.2 \times 10^5$ |

The microorganisms remain viable for at least 14 days after synthesis with glycerol, propylene glycol or Polarclean as solvent. This result confirms that biodegradable solvents may be used for encapsulation of Bacillus subtilis.

c2) Effect of Different Biodegradable Solvents in Ethanol Substitution on the Viability of Bacillus subtilis after Synthesis and Storage at 4° C. and 22° C. for 15 Days In a 2000 mL beaker, addition of 97.2 g of magnesium nitrate hexahydrate ($MgNO_3$, $6H_2O$) (99%, Sigma Aldrich) and 1000 mL of biodegradable solvent (Glycerol (Quaron >99.5%) or methyl-5-(dimethylamino)-2-methyl-5-oxopentanoate (RHODISOLV® Polarclean)) with stirring at 55° C. at 220 rm for 15 minutes. Addition, with stirring for 15 minutes, of 77.1 g of triethoxyphenylsilane (97%, Sigma Aldrich) and 22.9 g of hexadecyltrimethoxysilane (>85%, Sigma). Addition of 200 mL of culture medium of Bacillus subtilis (accessible under number CIP 52.62 from the Pasteur Institute) at $6.50\times10^7$ CFU/ml (the culture medium was prepared in a 3 L bioreactor by seeding Bacillus subtilis in 20 mL of BHI medium (OXOID) and then incubation for 18-24 h at 30° C., 200 rpm). Addition of 700 mL of 1M NaOH (97%, Sigma Aldrich) (pH 10) and stirring for 24 h. Two 500-mL samples of the mixture are taken. In darkness, one sample is kept in a stove at +22° C.±2° C. with a relative humidity of 30%, and the other is kept at +4±2° C. with a relative humidity of 65% for 15 days. A solid medium count on a Petri dish (90 mm diameter) is carried out at 37° C. to determine the concentration of bacteria at To ($N_0$), To+24 h ($N_{24\,h}$) and To+15d ($N_{15d}$). The results are presented in Table 9 below.

TABLE 9 concentration of microorganisms at To ($N_0$), To + 24 h ($N_{24\,h}$) and To + 15 days ($N_{15\,d}$) after synthesis as a function of the solvent used for synthesis and the storage temperature.

| | Storage temperature | Bacillus subtilis (CFU/ml) | | |
|---|---|---|---|---|
| | | $N_0$ | $N_{24\,h}$ | $N_{15\,d}$ |
| Glycerol | 4° C. | $6.5 \times 10^7$ | $2.1 \times 10^7$ | $2.9 \times 10^7$ |
| | 22° C. | $6.5 \times 10^7$ | $2.1 \times 10^7$ | $2.5 \times 10^7$ |
| Polarclean | 4° C. | $1.0 \times 10^7$ | $6.1 \times 10^6$ | $5.6 \times 10^6$ |
| | 22° C. | $6.5 \times 10^7$ | $1.0 \times 10^7$ | $6.2 \times 10^6$ |

The viability of Bacillus subtilis is maintained at +4° C. and +22° C. for at least 15 days after synthesis with glycerol or Polarclean as solvent. This result confirms that biodegradable solvents may be used for encapsulation of Bacillus subtilis.

c3) Effect of Encapsulation (Synthesis by Biodegradable Solvents as Ethanol Replacement) on the Viability of Bacillus subtilis after Thermal Treatment Synthesis is identical to that in example 2.1c2 with glycerol (Quaron >99.5%) or methyl-5-(dimethylamino)-2-methyl-5-oxopentanoate (RHODISOLV® Polarclean) as solvent. Two 500 mL samples of the mixture are taken. In darkness, 45 samples of 9 mL are taken. 3 batches of 15 samples are made up and are put in a stove (30% relative humidity) at +40° C., +60° C. and +80° C.±2° C., respectively. In parallel, in darkness, 3 batches of 15 samples of unencapsulated microorganisms are also made up and are put in a stove (20% relative humidity) at +60° C. and +80° C.±2° C., respectively. The rise to the set temperatures is calibrated over a time of 30 minutes, at the end of which the tubes are kept at the set core temperature for 2 min, 5 min and 10 minutes before taking out the tubes for counting. 3 tubes are thus taken for each variant of microorganisms and temperature. A solid medium count on a Petri dish (90 mm diameter) is carried out at 37° C. to determine the concentration of bacteria at To ($N_{0\,min}$), To+2 min ($N_{2\,min}$), To+5 min ($N_{5\,min}$) and To+10 min ($N_{10\,min}$). The results are presented in Table 10 below.

TABLE 10 concentration of microorganisms at To ($N_{0\,min}$), To + 2 min ($N_{2\,min}$), To + 5 min ($N_{5\,min}$) and To + 10 min ($N_{10\,min}$) after thermal treatment as a function of the solvent used for synthesis and the temperature of the thermal treatment.

| | | | Bacillus subtilis (CFU/ml) | | | |
|---|---|---|---|---|---|---|
| | | | $N_{0\,min}$ | $N_{2\,min}$ | $N_{5\,min}$ | $N_{10\,min}$ |
| Glycerol | Encapsulated | 40° C. | $2.90 \times 10^7$ | $2.20 \times 10^7$ | $2.10 \times 10^7$ | $2.40 \times 10^7$ |
| | | 60° C. | $6.50 \times 10^7$ | $6.50 \times 10^7$ | $6.50 \times 10^7$ | $6.50 \times 10^7$ |
| | | 80° C. | $6.50 \times 10^7$ | $2.00 \times 10^7$ | $2.00 \times 10^7$ | $2.00 \times 10^7$ |
| Polarclean | Encapsulated | 40° C. | $6.50 \times 10^7$ | $5.40 \times 10^7$ | $7.60 \times 10^7$ | $6.20 \times 10^7$ |
| | | 60° C. | $6.50 \times 10^7$ | $1.80 \times 10^7$ | $1.80 \times 10^7$ | $6.20 \times 10^6$ |
| | | 80° C. | $6.50 \times 10^7$ | $4.80 \times 10^6$ | $4.80 \times 10^6$ | $4.80 \times 10^6$ |
| No synthesis | Unencapsulated | 60° C. | $6.50 \times 10^7$ | $1.30 \times 10^7$ | $1.30 \times 10^7$ | $2.00 \times 10^7$ |
| | | 80° C. | $6.50 \times 10^7$ | $4.24 \times 10^4$ | $1.73 \times 10^3$ | $7.53 \times 10^3$ |

For the syntheses with glycerol and with Polarclean, the treatments reveal encapsulated *Bacillus subtilis* to be almost insensitive to heat compared to unencapsulated *Bacillus subtilis* (at 10 min, respectively $2.00 \times 10^6$ CFU/mL and $4.80 \times 10^6$ CFU/ml) whereas the concentration of unencapsulated *Bacillus subtilis* decreases considerably ($4.24 \times 10^4$ CFU/ml at 2 min). The results confirm that encapsulation provides thermal protection.

Example 2.2: Encapsulation of *Piriformospora indica* a) Compound $C_{16}$TMS PI

The fungus *Piriformospora indica* (*P. Indica*) (accessible under number DSM 11827 from the Max-Planck-Institut für terrestrische Mikrobiologie) is first put in an incubator (140-mm diameter dish) for 72 h at 28±1° C., with YCG agar in order to obtain a fresh culture. The mycelium is collected using a sterile spatula and then introduced into a conical flask containing a 0.5% solution of Tween 80 as well as beads. After stirring for 2 minutes, a solid medium count is performed to determine the starting concentration (N0, in CFU/mL).

5.56 g of magnesium nitrate hexahydrate (99%, Sigma Aldrich) is dispersed in 100 mL of absolute ethanol (99.9%, Carlo Erba). The mixture is stirred until completely dissolved. 10 g of hexadecyltrimethoxysilane ($C_{16}$TMS) (>85%, Sigma) is then added. The whole is stirred and then the solution pH is adjusted to a value of 10 by adding aqueous solution of sodium hydroxide (>97%, Sigma Aldrich) with a concentration of 1M. The formulation is then seeded at 10% with a preculture of *P. indica*. After stirring at room temperature for 24 h, the solid is separated from the solution by centrifugation (speed of 9000 rpm for 10 min), washed with distilled water three times before being frozen and lyophilized for 48 h (reference sample $C_{16}$TMS PI). For comparison, a sample is prepared in the same conditions in the absence of *P. indica*.

X-ray diffraction analysis indicates that in both cases a lamellar phase is obtained with a periodicity $d_{001}$ equal to 1.53 nm for the sample C16TMS PI and 1.60 nm for the compound without *P. indica*.

The SEM photographs of the sample $C_{16}$TMS PI show the presence of forms very similar to the hyphae observed with the fungus alone Hyphae (about 2 µm wide) covered with particles of material. The fungus is therefore encapsulated in its vegetative form (hyphae+conidiophores) in the material of formula I according to the invention.

b) Compound $C_{16}$TMS—Triethoxyphenylsilane b1) Effect of Glycerol as Replacement for Ethanol on the Viability of *Piriformospora indica* after Synthesis In a 500 mL beaker, addition of 9.72 g of magnesium nitrate hexahydrate ($MgNO_3$, $6H_2O$) (99%, Sigma Aldrich) and 100 mL of biodegradable solvent (Glycerol (Quaron >99.5%)) with stirring at 55° C. at 220 rpm for 15 minutes. Addition, with stirring for 15 minutes, of 7.71 g of triethoxyphenylsilane (97%, Sigma Aldrich) and 2.29 g of hexadecyltrimethoxysilane (>85%, Sigma). Addition of 20 mL of culture medium of *Piriformospora indica* (accessible under number DSM 11827 from the Max-Planck-Institut für terrestrische Mikrobiologie) at $3.00 \times 10^7$ CFU/ml. Addition of 70 mL of 1M NaOH (>97%, Sigma Aldrich) and stirring for 24 h. A solid medium count on a Petri dish (90 mm diameter) is carried out at 37° C. in the dark with 60% relative humidity to determine the concentration of microorganisms at To ($N_0$), To+24 h ($N_{24\,h}$) and To+14 days ($N_{14d}$) after synthesis. The results are presented in Table 11 below.

TABLE 11 concentration of microorganisms at To ($N_0$), To + 24 h ($N_{24\,h}$) and To + 14 days ($N_{14\,d}$) after synthesis

| | *Piriformospora indica* (CFU/ml) | | |
|---|---|---|---|
| | $N_0$ | $N_{24\,h}$ | $N_{14\,d}$ |
| Glycerol | $3.3 \times 10^6$ | $2.2 \times 10^6$ | $1.8 \times 10^6$ |

The microorganisms remain viable for at least 14 days after synthesis with glycerol as solvent. This result confirms that biodegradable solvents may be used for encapsulation of *Piriformospora indica*.

b2) Effect of Glycerol as Replacement for Ethanol on the Viability of *Piriformospora indica* after Synthesis and Storage at 4° C. and 22° C. for 30 Days In a 2000 mL beaker, addition of 97.2 g of magnesium nitrate hexahydrate ($MgNO_3$, $6H_2O$) (99%, Sigma Aldrich) and 1000 mL of biodegradable solvent (Glycerol (Quaron >99.5%)) with stirring at 55° C. at 220 rpm for 15 minutes. Addition, with stirring for 15 minutes, of 77.1 g of triethoxyphenylsilane (97%, Sigma Aldrich) and 22.9 g of hexadecyltrimethoxysilane (>85%, Sigma). Addition of 200 mL of culture medium of *Piriformospora indica* (accessible under number DSM 11827 from the Max-Planck-Institut für terrestrische Mikrobiologie) at $3.00 \times 10^7$ CFU/ml. Addition of 700 mL of 1M NaOH (97%, Sigma Aldrich) and stirred for 24 h. 2 samples of 500 mL of the mixture are taken. In darkness, one sample is kept in a stove at +22° C.±2° C. with a relative humidity of 30%, and the other is kept at +4±2° C. with a relative humidity of 65% for 30 days. A solid medium count on a Petri dish (90 mm diameter) is carried out at 37° C. in order to determine the concentration of fungi at To ($N_0$), To+24 h ($N_{24\,h}$), To+15d ($N_{15d}$) and To+30d ($N_{30d}$). The results are presented in Table 12 below.

TABLE 12 concentration of microorganisms at To ($N_0$), To + 24 h ($N_{24\,h}$), To + 15 days ($N_{15\,d}$) and To + 30 d ($N_{30\,d}$) after synthesis as a function of storage temperature

| | Storage temperature | *Piriformospora indica* (CFU/ml) | | | |
|---|---|---|---|---|---|
| | | $N_0$ | $N_{24\,h}$ | $N_{15\,d}$ | $N_{30\,d}$ |
| Glycerol | 4° C. | $3.75 \times 10^6$ | $5.30 \times 10^6$ | $4.60 \times 10^6$ | $1.14 \times 10^6$ |
| | 22° C. | $3.75 \times 10^6$ | $5.30 \times 10^6$ | $5.60 \times 10^5$ | $4.85 \times 10^4$ |

The viability of *Piriformospora indica* is maintained at +4° C. and +22° C. for at least 15 days after synthesis with glycerol as solvent. This result confirms that glycerol may be used for encapsulation of *Piriformospora indica*.

b3) Effect of Encapsulation (Synthesis by Glycerol as a Replacement for Ethanol) on the Viability of *Piriformospora indica* after Thermal Treatment Synthesis is identical to that in example 2.2b2. Two 500 mL samples of the mixture are taken. In darkness, 45 samples of 9 mL are taken. 3 batches of 15 samples are made up and are put in a stove (30% relative humidity) at +40° C., +60° C. and +80° C.±2° C., respectively. In parallel, in darkness, 3 batches of 15 samples of unencapsulated microorganisms are also made up and are put in a stove (20% relative humidity) at +40° C., +60° C. and +80° C.±2° C., respectively. The rise to the set temperatures is calibrated over a time of 30 minutes, at the end of which the tubes are kept for 2 min, 5 min and 10 minutes at the set core temperature before taking out the tubes for counting. 3 tubes are thus taken for each variant of microorganisms and temperature. A solid medium count on a Petri dish (90 mm diameter) is carried out at 37° C. in order to determine the concentration of fungi at To ($N_{0\ min}$), To+2 min ($N_{2\ min}$), To+5 min ($N_{5\ min}$) and To+10 min ($N_{10\ min}$). The results are presented in Table 13 below.

TABLE 13 concentration of microorganisms at To ($N_{0\ min}$), To + 2 min ($N_{2\ min}$) To + 5 min ($N_{5\ min}$) and To + 10 min ($N_{10\ min}$) after thermal treatment as a function of the temperature of the thermal treatment.

| | | | Piriformospora indica (CFU/ml) | | | |
|---|---|---|---|---|---|---|
| | | | $N_{0\ min}$ | $N_{2\ min}$ | $N_{5\ min}$ | $N_{10\ min}$ |
| Glycerol | Encapsulated | 40° C. | $3.00 \times 10^7$ | $1.10 \times 10^6$ | $1.10 \times 10^6$ | $1.00 \times 10^6$ |
| | | 60° C. | $3.00 \times 10^7$ | $4.40 \times 10^4$ | $4.55 \times 10^4$ | $1.95 \times 10^4$ |
| | | 80° C. | $3.00 \times 10^7$ | $1.50 \times 10^1$ | $0.00 \times 10^0$ | $0.00 \times 10^0$ |
| No synthesis | Unencapsulated | 40° C. | $5.14 \times 10^6$ | $1.69 \times 10^6$ | $1.53 \times 10^6$ | $1.32 \times 10^6$ |
| | | 60° C. | $5.14 \times 10^6$ | $7.10 \times 10^3$ | $9.06 \times 10^3$ | $1.31 \times 10^2$ |
| | | 80° C. | $5.14 \times 10^6$ | $0.00 \times 10^0$ | $0.00 \times 10^0$ | $0.00 \times 10^0$ |

For the syntheses with glycerol, the treatments reveal lower thermal sensitivity of encapsulated *Piriformospora indica* compared to unencapsulated *Piriformospora indica* (at 60° C./2 min, $4.40 \times 10^4$ CFU/mL versus $7.10 \times 10^3$ CFU/ml; at 60° C./5 min $4.55 \times 10^4$ CFU/mL versus $9.06 \times 10^3$ CFU/ml; at 60° C./10 min $1.95 \times 10^4$ CFU/mL versus $1.31 \times 10^2$ CFU/ml; at 80° C./2 min, $1.50 \times 10^1$ CFU/mL versus $0.00 \times 10^0$ CFU/ml). The results confirm that encapsulation provides thermal protection.

Example 2.3: Encapsulation of Spirulina a) Compound C-16 Alga 2 g of magnesium nitrate hexahydrate (99%, Sigma Aldrich) is dispersed in 20 mL of absolute ethanol (99.9%, Carlo Erba). The mixture is stirred until completely dissolved. 1 g of Spirulina (cyanobacterium *Arthrospira platensis* marketed under the name SPIRULINA NATURAL by the company EARTHRISE®) is introduced into the medium and then 1.111 g of hexadecyltrimethoxysilane ($C_{16}$TMS) (>85%, Sigma) is added to each mixture. The whole is stirred and then the solution pH is adjusted to a value of 9 by adding 9 mL of an aqueous solution of sodium hydroxide (>97%, Sigma Aldrich) with a concentration of 1M. After stirring at room temperature for 24 h, the solid is separated from the solution by centrifugation (speed of 10000 rpm for 10 min), washed three times with ethanol before being dried in a stove at 40° C. for 48 h. The compound obtained is then ground in an agate mortar before being characterized and is designated C-16 alga. For comparison, a sample was also prepared in the absence of Spirulina (reference sample Talc conventional).

X-ray diffraction analysis indicates that in both cases a lamellar phase with a structure of the talc type is obtained with a periodicity $d_{001}$ equal to 1.6 nm in both cases (presence of diffraction peaks in the angle domains 2-10°2 theta, 15-25°2 theta, 30-40°2 theta and 55-65°2 theta corresponding respectively to reflections on the lattice planes (001), (020; 110), (130; 220) and (060:330)). The presence of Spirulina does not inhibit formation of the material. The presence of Spirulina does not induce an increase in the periodicity $d_{001}$. Spirulina is therefore well encapsulated in its vegetative form (twisted structure) in the material according to the invention.

Figure 2:
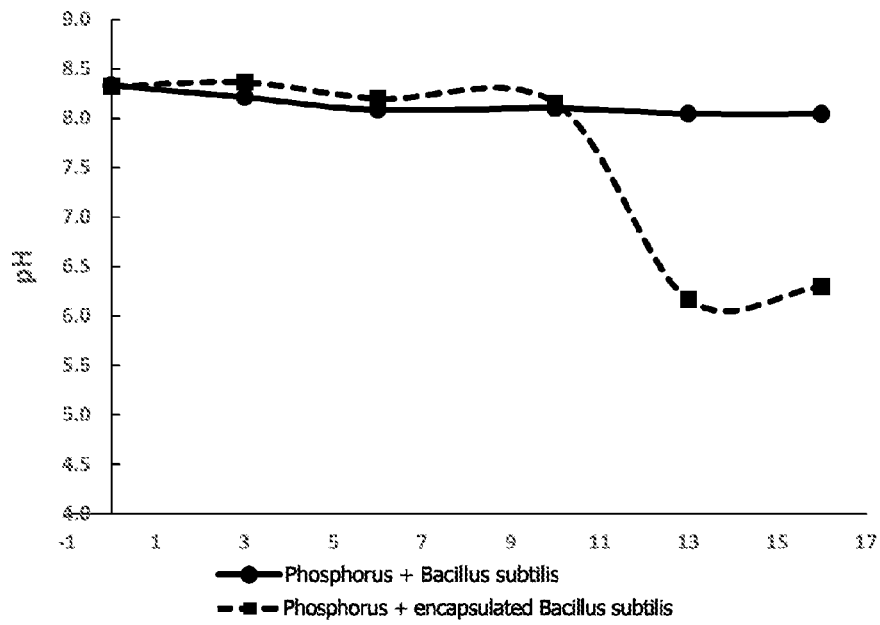
FIG. 2 shows the variation of culture medium pH as a function of time (in days) in the presence of *Bacillus subtilis* CIP 52.62, encapsulated (compound according to the invention) and unencapsulated, and in the presence of phosphorus in the conditions of example 3.

EXAMPLE 3: EVALUATION OF THE CAPACITY FOR SOLUBILIZATION OF A Water-Insoluble Phosphate Using a Compound According to the Invention a) Preparation of the Encapsulated Bacterium:

10 g of magnesium nitrate hexahydrate (99%, Sigma Aldrich) is added to 20 mL of absolute ethanol (99.9%, Carlo Erba). The mixture is stirred until completely dissolved. 10 g of phenyltrimethoxysilane (98%, ABCR) is then added with stirring. While stirring, the mixture is seeded at 10% v/v of a preculture of *Bacillus subtilis* CIP 52.62 of concentration $10^8$ CFU/mL. The whole is stirred and then the solution pH is adjusted to a value of 10 by adding aqueous solution of sodium hydroxide (>97%, Sigma Aldrich) with a concentration of 1M. After stirring at room temperature for 24 h, a bacterial count is performed on the seeded ensemble defining the bacterial concentration at $1.7 \times 10^5$ CFU/ml.

b) Solubilization Test:

In 200 mL conical flasks, a liquid culture medium (glucose, 10 g/L; $MgCl_2.6H_2O$, 5 g/L; $MgSO_4.7H_2O$, 0.25 g/L; KCl, 0.2 g/L; $(NH_4)_2SO_4$, 0.1 g/L) of pH 7.0, supplemented with a source of phosphorus insoluble in an aqueous medium ($NH_4MgPO_4 \cdot 6H_2O$, 8.9 g/conical flask) is prepared. Each conical flask is then seeded with 1 mL of a preculture of *Bacillus subtilis* CIP 52.62 (Pasteur Institute) at a concentration of $6.5 \times 10^4$ CFU/mL (free) or with 382.3 µL of a preculture of *Bacillus subtilis* CIP 52.62 at a concentration of $1.7 \times 10^5$ CFU/ml (compound according to the invention 100% Phenyl BS: encapsulated bacterium prepared according to example 3a). The conical flasks are kept in a stove with stirring. A colony count is carried out every 2 days as well as measurement of the pH and of the concentration of solubilized phosphorus and of phosphorus immobilized by the bacterial flora (measurement of total phosphorus by ICP and measurement of inorganic phosphate in solution by HPIC). The results are presented in FIGS. 1 to 3. Comparison of the growth of *Bacillus subtilis* indicates better capacity for solubilization of water-insoluble phosphorus (FIG. 1). Comparison of the growth of *Bacillus subtilis* indicates a lowering of the solution pH correlated with solubilization of bacterial origin of the phosphorus (FIG. 2). Comparison of the phosphorus concentration indicates bacterial solubilization greater than its immobilization by the bacterial flora (FIG. 3). We therefore find better growth of the bacteria encapsulated according to the invention and better solubilization of phosphorus when such bacteria are used.

The invention claimed is:

1. A method of encapsulating a compound selected from the group consisting of at least one active substance, at least one microorganism and mixtures thereof in an organic-inorganic hybrid material of 2:1 lamellar structure, said organic-inorganic hybrid material having the following general formula I:

$$Na_x[(Mg_3)(Al_x(RSi)_{4-x})O_{8+x}(OH)_2] \quad (I)$$

in which x is a number such that 0≤x<1.2 and

R represents a $C_1$-$C_{30}$ alkyl group, an aryl group, a ($C_1$-$C_{30}$ alkyl)aryl group or a $C_1$-$C_{30}$ O-alkyl group, and the alkyl group may be substituted with a group selected from a phenyl, vinyl, or mercaptopropyl group;

the method comprising:

a) sol-gel synthesis of the organic-inorganic hybrid material of 2:1 lamellar structure in the presence of the compound; and b) recovery of the compound encapsulated in the material of general formula I, wherein the source of silicon necessary for synthesis of the material of formula I of step a) is an organoalkoxysilane or a mixture of organoalkoxysilanes of the following general formula II:

$$RSi(OR')_3 \quad (II)$$

in which

R' is a methoxy or ethoxy group.

2. The method as claimed in claim 1, wherein the encapsulated compound is a microorganism and step a) comprises the following successive steps:

a1) adding a source of magnesium, the microorganism, a solvent, a source of silicon and in the case when x≠0, the source of aluminum;

a2) adjusting the pH to between 8 and 14;

a3) stirring the mixture so as to obtain a gel.

3. The method as claimed in claim 2, wherein it comprises the following successive steps after step a3):

a4) recovering the solid phase of the gel obtained in step a3);

a5) drying the solid phase of the gel obtained in step a4).

4. The method as claimed in claim 3, wherein the drying step a5) consists of lyophilization.

5. The method as claimed in claim 2, wherein the microorganism is in the form of a preculture of said microorganism and said method comprises a preliminary step before step a) of preparing the preculture of microorganism.

6. The method as claimed in claim 1, wherein the source of silicon is selected from the group consisting of phenyltrimethoxysilane of the following formula (a): phenyl-Si(OCH_3)_3 (a), tetraethylorthosilicate of the following formula (b): Si(OC_2H_5)_4 (b), hexadecyltrimethoxysilane of the following formula (c): $CH_3(CH_2)_{14}CH_2$—Si(OCH_3)_3 (c) and mixtures thereof.

7. The method as claimed in claim 6, wherein the encapsulated compound is an active substance and the source of silicon is a mixture of phenyltrimethoxysilane (a) and tetraethylorthosilicate (b).

8. The method as claimed in claim 6, wherein the encapsulated compound is a microorganism and the source of silicon is selected from the group consisting of phenyltrimethoxysilane (a) and hexadecyltrimethoxysilane (c).

9. The method as claimed in claim 1, wherein x=0.

10. The method as claimed in claim 1, wherein the compound is an active substance selected from the group consisting of an amino acid, an essential oil, a vitamin and mixtures thereof.

11. The method as claimed in claim 1, wherein the compound is a microorganism selected from the group consisting of a bacterium, a microalga, a fungus, and mixtures thereof.

12. The method as claimed in claim 1, wherein the encapsulated compound is an active substance and step a) comprises the following successive steps:

a1) adding a source of magnesium, the active substance, the source of silicon, in the case when x≠0, the source of aluminum, and an optional solvent;

a2) adjusting the pH to between 8 and 14;

a3) stirring the mixture, so as to obtain a gel;

a4) recovering the solid phase of the gel obtained in step a3);

a5) drying the solid phase of the gel obtained in step a4).

13. The method as claimed in claim 1 wherein the source of silicon is selected from the group consisting of phenyltrimethoxysilane (a), methyltriethoxysilane (c) and a mixture of phenyltrimethoxysilane (a) with tetraethylorthosilicate (b).

14. A compound encapsulated in an organic-inorganic hybrid material of 2:1 lamellar structure, said organic-inorganic hybrid material having the following general formula I:

$$Na_x[(Mg_3)(Al_x(RSi)_{4-x})O_{8+x}(OH)_2] \quad (I)$$

in which x is a number such that 0≤x<1.2 and

R represents a $C_1$-$C_{30}$ alkyl group, an aryl group, a ($C_1$-$C_{30}$ alkyl)aryl group or a $C_1$-$C_{30}$ O-alkyl group, and the alkyl group may be substituted with a group selected from a phenyl, vinyl, or mercaptopropyl group;

the encapsulated compound being selected from the group consisting of at least one active substance, at least one microorganism and mixtures thereof.

15. A composition comprising the compound encapsulated in an organic-inorganic hybrid material of 2:1 lamellar structure as claimed in claim 14 and an excipient.

16. The composition as claimed in claim 15, which is in solid form, in liquid form or in the form of gel.

17. The composition as claimed in claim 15, which further comprises nutrients, organic raw materials and/or mineral raw materials.

18. The compound encapsulated in an organic-inorganic hybrid material of 2:1 lamellar structure as claimed in claim 14, which is obtained by a method comprising:

a) sol-gel synthesis of the organic-inorganic hybrid material of 2:1 lamellar structure in the presence of the compound; and b) recovery of the compound encapsulated in the material of general formula I, wherein the source of silicon necessary for synthesis of the material of formula I of step a) is an organoalkoxysilane or a mixture of organoalkoxysilanes of the following general formula II:

$$RSi(OR')_3 \quad (II)$$

in which

R' is a methoxy or ethoxy group.

19. A method for fertilizing, feeding, stimulating growth and/or prophylaxis of plants and/or improving the physical, chemical and/or biological properties of the soil or of the culture substrate of plants comprising administration of an effective amount of a compound as claimed in claim 14, or of a composition comprising the compound encapsulated in an organic-inorganic hybrid material of 2:1 lamellar structure as claimed in claim 14 and a suitable excipient, to a plant in need thereof or to the soil or culture substrate of a plant in need thereof.

20. The method as claimed in claim 19, wherein the administration is an application to the leaves, to the roots, in the open or outside the soil of the plant in need thereof.

* * * * *